United States Patent [19]

Cares

[11] Patent Number: 5,139,686
[45] Date of Patent: Aug. 18, 1992

[54] METHOD AND APPARATUS FOR FILTERING DRY CLEANING SOLVENT

[75] Inventor: Geroge Cares, Grand Rapids, Mich.

[73] Assignee: GPL Partnership, Kenwood, Mich.

[21] Appl. No.: 592,576

[22] Filed: Oct. 4, 1990

[51] Int. Cl.⁵ .............................................. B01D 24/46
[52] U.S. Cl. .................................. 210/797; 210/791; 210/232; 210/438; 210/451; 210/453; 210/455; 210/457; 210/491
[58] Field of Search ............... 210/167, 409, 438, 491, 210/443, 451, 455, 453, 457, 232, 505, 797, 282, 433.1, 435, 791, 437, 483, 490, 497.01, 767, 460, 503, 507, 508

[56] References Cited

U.S. PATENT DOCUMENTS

| | | | |
|---|---|---|---|
| 2,076,980 | 4/1937 | Cooper | 210/767 |
| 2,358,238 | 9/1944 | Lindblad | 210/435 |
| 2,855,105 | 10/1958 | Nugent | 210/443 |
| 3,261,473 | 7/1966 | Riede | 210/282 |
| 3,353,682 | 11/1967 | Pall et al. | 210/505 |
| 3,406,831 | 10/1968 | Bush et al. | 210/438 |
| 3,419,151 | 12/1968 | Smith et al. | 210/460 |
| 3,730,347 | 5/1973 | Giampalmi et al. | 210/266 |
| 3,836,005 | 9/1974 | Bauer | 210/266 |
| 4,211,661 | 7/1980 | Perry | 210/491 |
| 4,266,412 | 5/1981 | Merenda | 210/167 |
| 4,726,901 | 2/1988 | Pall et al. | 210/496 |
| 5,013,438 | 5/1991 | Smith | 210/455 |

OTHER PUBLICATIONS

Article—Barry Victor, "Powder Filtration Gains Ground in U.S.", Aug. 1989, p. 64.
Article—"International Fabricare Institute", Nov. 1990, pp. 6–7.

*Primary Examiner*—Robert A. Dawson
*Assistant Examiner*—David Reifsnyder
*Attorney, Agent, or Firm*—Price, Heneveld, Cooper, Dewitt & Litton

[57] ABSTRACT

Disclosed is a filtration process for the removal of undesired substances from dry cleaning fluids. Illustratively, a cylindrically-shaped batt of a long-fiber synthetic washable fabric filter is attached to a spoke-like rigid frame and the fabric-frame assembly is placed into a filter housing having a fluid collecting center rod. Contaminated dry cleaning fluid is introduced to the housing, passed inwardly through the fabric, and a contaminant free permeate is collected by the fluid collecting center rod.

17 Claims, 3 Drawing Sheets

U.S. Patent     Aug. 18, 1992     Sheet 1 of 3     5,139,686
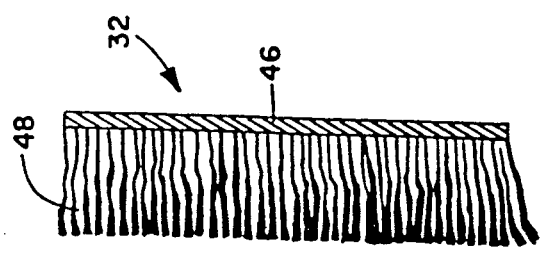
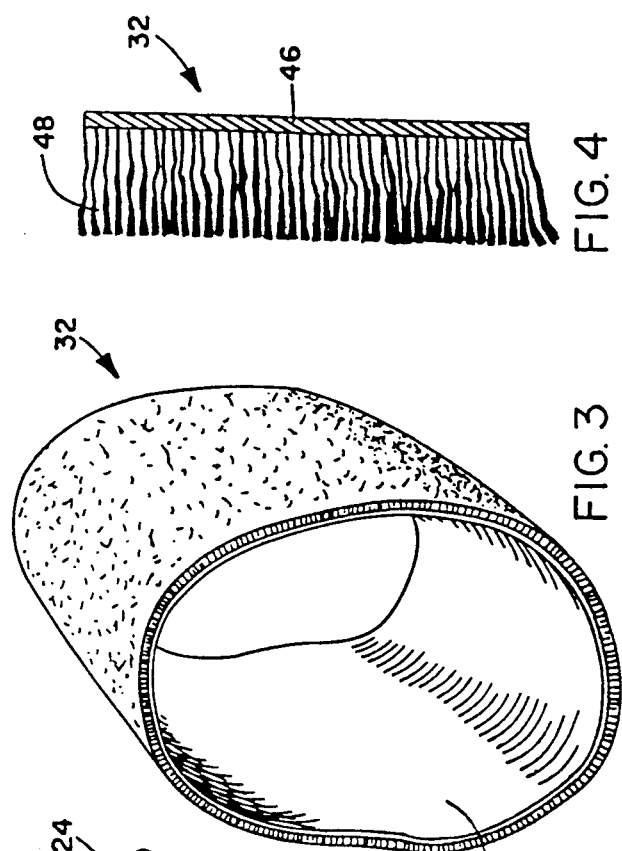
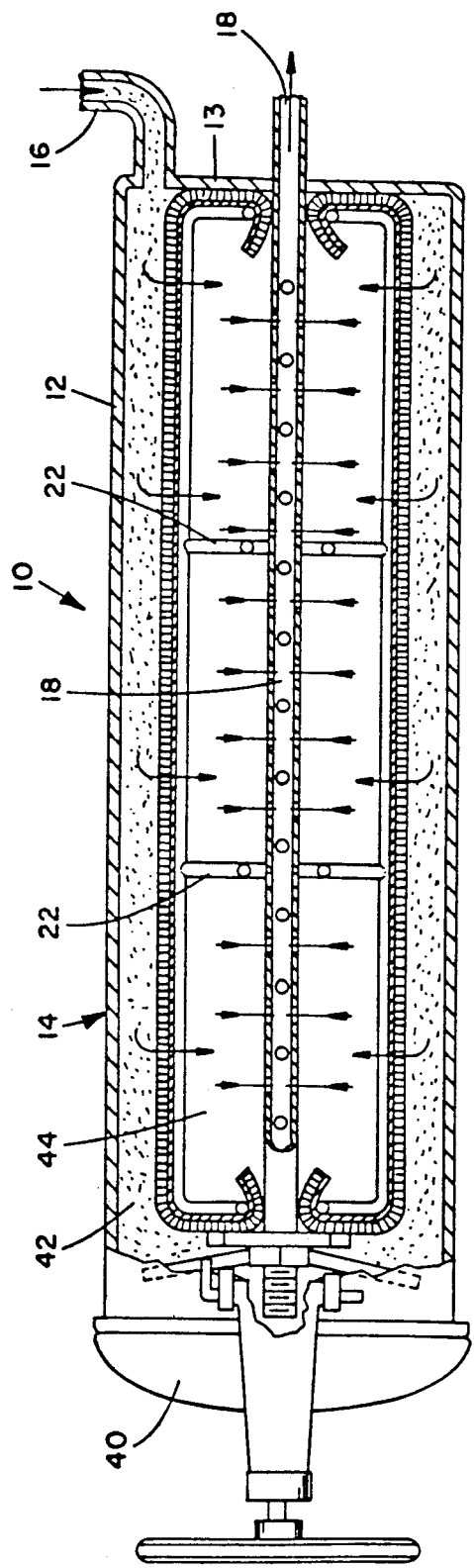
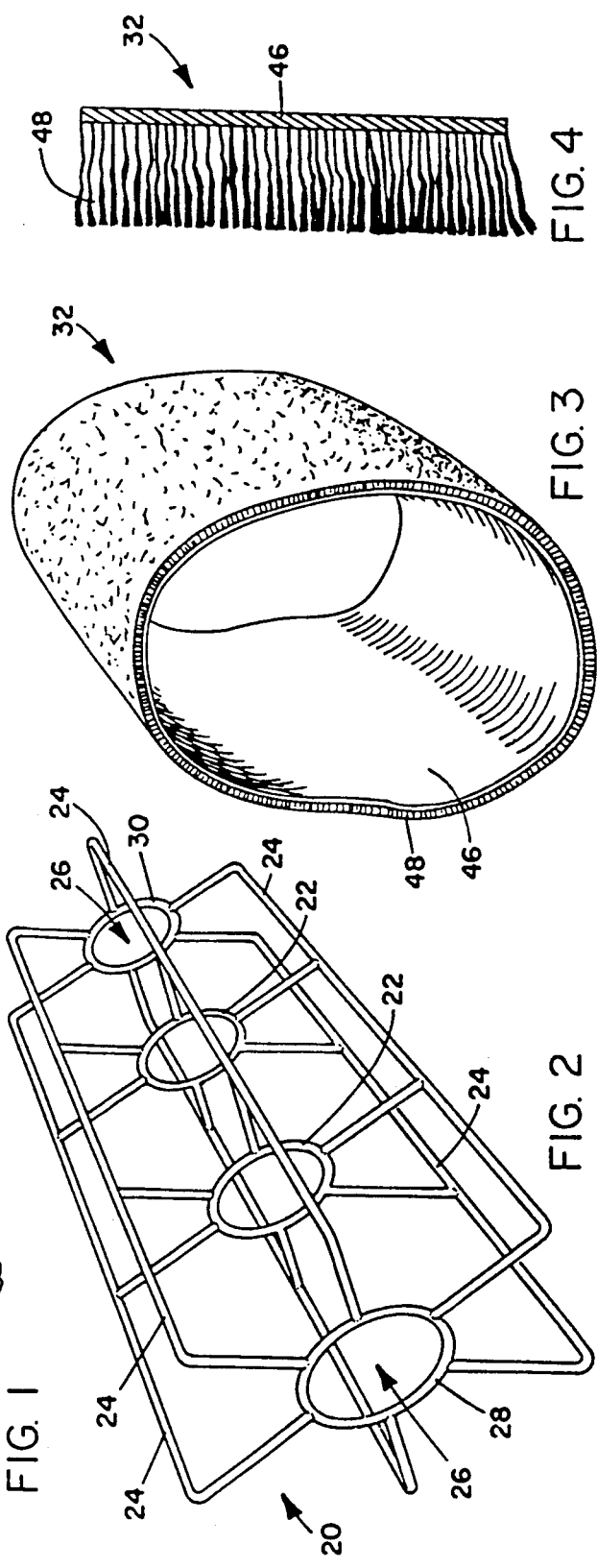

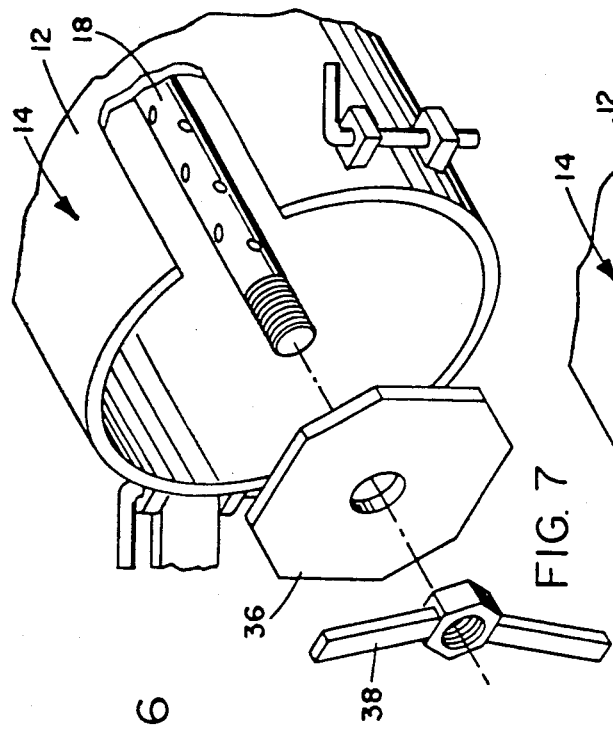
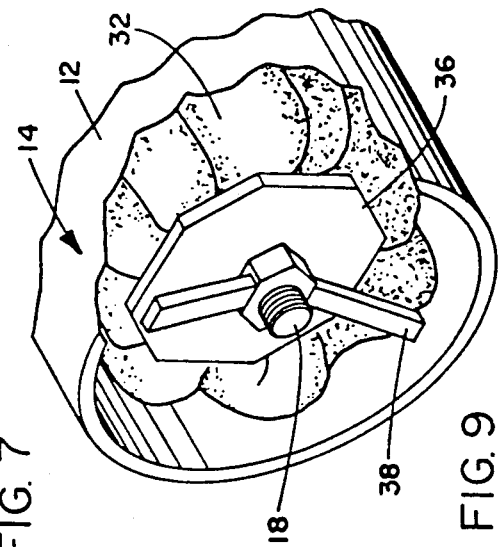
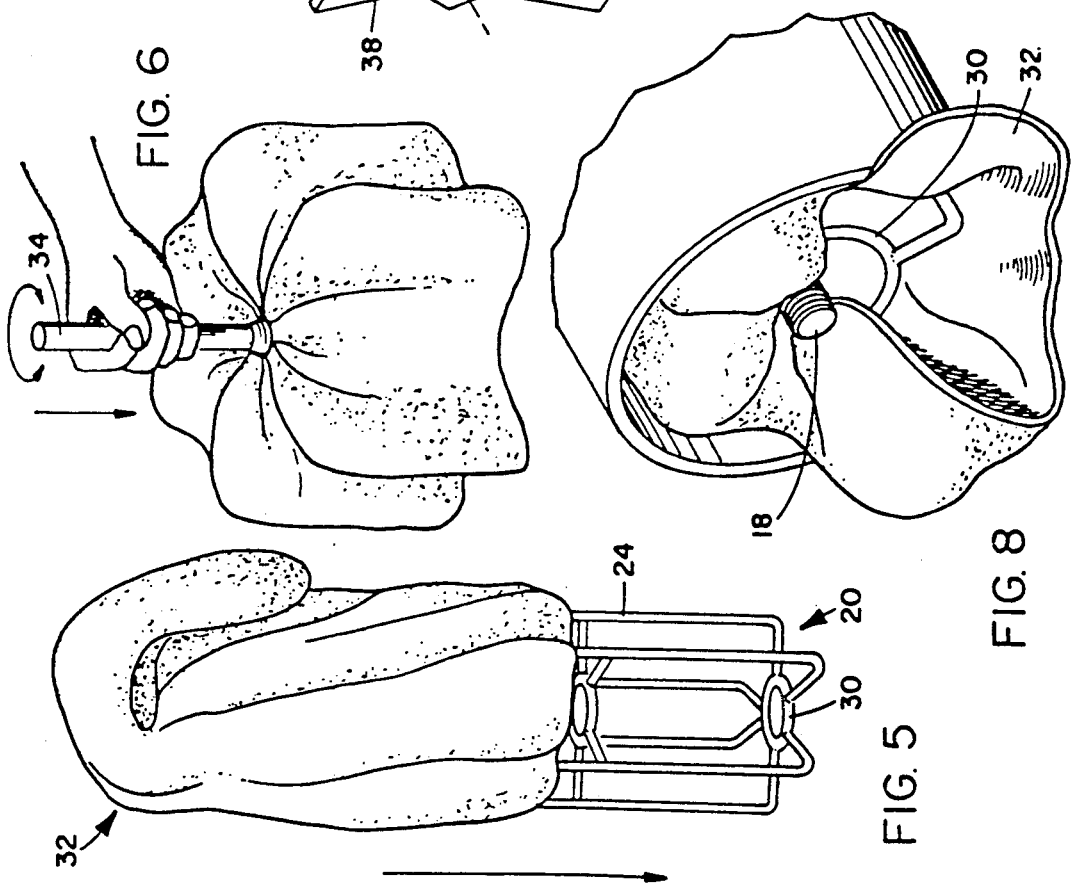

5,139,686

METHOD AND APPARATUS FOR FILTERING DRY CLEANING SOLVENT

BACKGROUND OF THE INVENTION

1. Field of the Invention

The present invention relates generally to improved techniques for filtering and, more particularly, to a method for filtering undesired substances from dry cleaning fluids and an apparatus for accomplishing the same.

2. Background

Filtration is a much used technique for separating wanted substances from those which are unwanted. In one form of filtration, a filter separates the unwanted substances from a feed stream into a retentate which forms on the surface of the filter and a permeate which flows through the filter. In the dry cleaning industry, filtration systems are widely used for filtering dry cleaning solvents.

A serious issue facing society today is that of hazardous waste disposal. In the dry cleaning industry, the largest source of hazardous waste is from the filtration systems on dry cleaning machinery. Cartridge filtration systems are the most widely used systems for filtering dry cleaning solvents. A major disadvantage of these filtration systems is that they retain a relatively large amount of dry cleaning solvent within the cartridge. Since dry cleaning solvents such as pertchlorethylene are considered by regulators to be toxic, their presence within the used filters mandates their being treated as hazardous waste. With the increasing shortage of space in land fills forcing the cost of hazardous waste disposal up, the present use of cartridge filtration systems is becoming prohibitively expensive.

A currently available alternative to the cartridge filtration system is a modified flex tube or bag type powder type filter. The powder filter incorporates a series of finely woven polyester discs mounted on a hollow shaft. These discs are coated with a powder composed of diatomaceous earth which acts as the filtering material. These powder filters are regenerated by spinning the discs which throws all of the powder and the dirt off of the discs. The powder and dirt are then flushed to a still for cookdown. While this system does produce far less bulk and weight of hazardous waste than the cartridge filtration system, and is therefore less expensive to operate from a disposal point of view, this system does have the disadvantage of being quite labor intensive and time consuming.

BRIEF SUMMARY

The present invention provides a method and apparatus for removing contaminants from dry cleaner fluids by filtering contaminated dry cleaner fluids through a washable fabric from the outside of the fabric to the inside of the fabric and removing those substances from the fabric filter by washing with normal detergents and water. The fabric is a "fur-like" synthetic material. The fabric is preferably made from a mixture of polyester fibers and acrylic fibers. The furry side of the material is the side which contacts the contaminated dry cleaning fluid. By passing the contaminated fluid through the material, the outer portions of the long fibers which give the fur-like quality to the material collect the contaminants while the purified dry cleaning fluid passes through to the other side of the material.

BRIEF DESCRIPTION OF THE FIGURES

FIG. 1 is a sectional side elevation of an exemplary apparatus useful in the practice of the instant invention;

FIG. 2 is a perspective view of a rigid frame support used in the practice of the instant invention;

FIG. 3 is a perspective view of a cylindrically shaped batt of long-fiber synthetic fabric used in the practice of the present invention;

FIG. 4 is a cross-sectional view of a fabric used in the practice of the present invention;

FIG. 5 is a side perspective view of the fabric being fitted over the rigid frame support for use in the practice of the present invention;

FIG. 6 is a fragmentary perspective view of a filter tucking rod curling the fabric over and into a first ring of the rigid frame in accordance with the present invention;

FIG. 7 is an exploded view of the center collecting rod, backing plate and wing nut of the present invention;

FIG. 8 is fragmentary perspective view of the fabric being tucked over the end ring of the rigid frame in accordance with the present invention;

FIG. 9 is a fragmentary perspective view of the backing plate and wing nut fixing the fabric in place in accordance with the present invention.

DETAILED DESCRIPTION OF THE INVENTION

Figure 10:
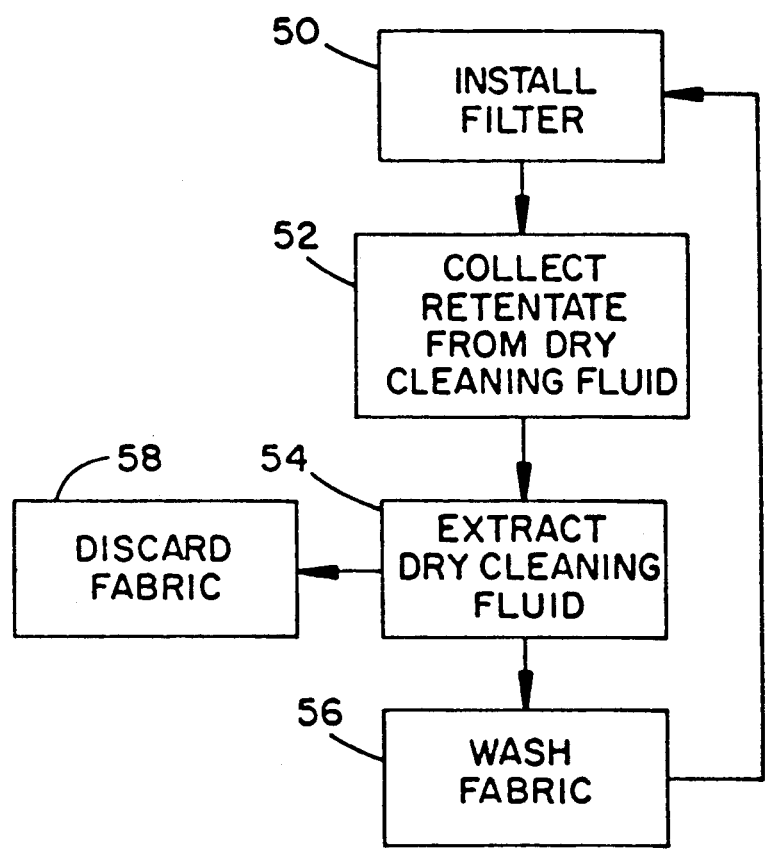
FIG. 10 is a flow diagram of a method according to the instant invention.

Referring now specifically to the Figures, FIG. 1 illustrates a schematic diagram of an exemplary apparatus according to the present invention. A filter 10 includes a cylindrical housing 14 having a wall 12, an inlet line 16, and a fluid collecting center rod 18. Contaminated dry cleaning fluid enters the housing 14 through the inlet line 16 and, following purification, exits the housing 14 through the rod 18 which penetrates wall 12 of the housing 14. Purification of the contaminated dry cleaning fluid is achieved by passing the contaminated dry cleaning fluid through a cylindrical batt of fabric 32 which is supported on a spoke-like rigid frame 20 located within the housing 14.

The spoke-like rigid frame 20 is composed of a plurality of parallel rings 22 connected by a plurality of support members 24 extending between the rings 22. The plurality of rings 22 define a cylindrical hollow core 26 which has a first ring 28 and an end ring 30. Fabric 32 is secured to the frame 20 by sliding the fabric 32 over the frame 20 and curling the fabric 32 over and into the first ring 28 of the frame 20. The frame 20 is then placed into the housing 14 by inserting the fluid collecting center rod 18 through the core 26 until the frame 20 abuts an interior portion 13 of wall 12 of the filter 10, whereby the fabric 32 becomes pinched between the inner portion of the first ring 28, the interior wall 12, thereby sealing the space between the first ring 28, the interior wall 12 and the center rod 18 so that no contaminated dry cleaning fluid may avoid filtration through the fabric 32. The curling of the fabric 32 over and into the first ring 28 can be facilitated by use of a filter tucking rod 34 as shown in FIG. 6.

Following placement of the frame 20 into the housing 14, the fabric 32 is tucked over and into the space between the end ring 30 and the protruding rod 18. A backing plate 36 is then affixed to the rod 18 and secured to rod 18 by a wing nut 38. Tightening of the wing nut 38 pinches the fabric 32 between the inner portion of the end ring 30, the backing plate 36 and the center rod 18 to facilitate the prevention of contaminated dry cleaning fluid avoiding filtration through the fabric 32. Tightening of the nut 38 also facilitates the seal created by the fabric 32 between the interior wall 12, the first ring 28 and the center rod 18. Prior to operation, a housing door 40 is closed so as to prevent leakage of the dry cleaning fluid into the external environment.

In operation, contaminated dry cleaning fluid enters the filter 10 through the input line 16 and circulates in an outer region 42 of the housing 14. The fluid passes inwardly from the outer region 42 through the fabric 32 into an inner region 44 from where the purified fluid or permeate is collected by rod 18 and passed out of the filter 10. The filtering of the contaminated dry cleaning fluid is accomplished by the fabric 32. As shown in FIG. 4, the fabric 32 consists of a cloth core 46 and a fibrous region 48. The fibrous region 48 faces the outer region 42 of the housing 14 and filters the contaminants from the dry cleaning fluid as it passes inwardly from the outer region 42 to the inner region 44. For reasons not completely understood, the contaminants in the dry cleaning fluid are deposited and form a retentate on the outer portions of the fibrous region and do not penetrate to the cloth core 46 of the fabric 32. This allows a greater quantity of contaminant to be captured by the fabric 3 without blocking the passage of purified dry cleaning fluid. Fabric 32 is preferably made from a mixture of polyester fibers and acrylic fibers and is most preferably made from a fabric which is a mixture of 90% polyester fibers and 10% acrylic fibers known as "Sherpa Fur" available from Northbriar.

After the filter that is installed at 50 and the fabric 32 becomes saturated with contaminants from use (52), the fabric 32 is removed from the frame 20. Residual dry cleaning fluid can be evaporated from the fabric 32 by conventional vapor recovery techniques at 54. The fabric 32 may then be washed in conventional detergents and water in order to remove the deposited contaminants at 56. Once clean, the fabric 32 may be placed back in service (50) as outlined above rather than being disposed in a hazardous waste fill. If water pollution laws in a region prevent the washing of the fabric 32, which does not allow its reuse, the fabric 32 is discarded at 58. The fabric is less expensive to dispose of than cartridge filtration systems because the fabric can be compacted to about one third the volume of a cartridge filter.

Changes and modifications in the specifically described embodiments can be carried out without departing from the principles of the invention which is intended to be limited only by the scope of the appended claims, as interpreted according to the principles of patent law, including the doctrine of equivalents.

The embodiments of the invention in which an exclusive property or privilege are claimed are defined as follows:

1. A method for removing contaminants from a dry cleaning fluid comprising:
    (a) providing a cylindrically-shaped filter housing having a fluid collecting center rod, a spoked rigid frame having a plurality of parallel rings forming a cylindrically shaped hollow core, and a cylindrically-shaped batt of a long-fiber synthetic fabric;
    (b) sliding said fabric over said rigid frame;
    (c) curling said fabric over and into a first ring of said rigid frame;
    (d) placing said frame into said housing by inserting said fluid collecting center rod through said hollow core of said rigid frame so that said rigid frame abuts an interior wall of said filter, whereby said fabric becomes pinched between said first ring, said interior wall, and said center rod, thereby sealing a space between said first ring, said interior wall, and said center rod;
    (e) tucking said fabric over and into a space between an end ring of said rigid frame and said center rod;
    (f) affixing a backing plate over said center rod and said rigid frame, whereby said fabric provides a barrier and seals a space between said fluid collecting center rod, said rigid frame, and said backing plate; and
    (g) introducing a contaminated dry cleaning fluid to said housing, passing said contaminated fluid through said fabric, and collecting a contaminant free permeate with said fluid collecting center rod.

2. A method in accordance with claim 1, wherein said fabric collects a contaminant containing retentate.

3. A method in accordance with claim 2, wherein said contaminant containing retentate is removed from said fabric by washing said fabric with conventional detergents and water.

4. A method in accordance with claim 3, wherein said backing plate is secured over said center rod and said rigid frame with a wing nut.

5. A method in accordance with claim 4, wherein said housing of said dry cleaning fluid filter includes a door that is closed so as to seal off said housing from the external environment.

6. A method for removing contaminants from a dry cleaning fluid comprising:
    (a) providing a filter including a long-fiber synthetic fabric;
    (b) passing a contaminated dry cleaning fluid through said fabric, whereby said fabric collects a contaminant containing retentate;
    (c) evaporating dry cleaning fluid from said fabric;
    (d) washing said retentate-containing-fabric with conventional detergents and water and thereby removing said retentate from said fabric; and
    (e) reusing said fabric.

7. A filter for purifying dry cleaning fluid comprising:
    (a) a housing;
    (b) a spoked rigid frame in said housing, said spoked rigid frame having a plurality of rigid parallel rings and a plurality of rigid support members extending between said rings, whereby said plurality of rings defines a cylindrical hollow core;
    (c) a limp cylindrical batt of textile fabric encompassing said frame;
    (d) means for admitting fluid at an outer portion of the housing; and
    (e) means for removing fluid from a central portion of the housing whereby fluid flows through said fabric in an inward direction.

8. A filter in accordance with claim 7, wherein said fabric is a synthetic fur material.

9. A filter in accordance with claim 8, wherein said fabric is a mixture of polyester fibers and acrylic fibers.

10. A filter in accordance with claim 9, wherein said fabric is a mixture of 90% polyester fibers and 10% acrylic fibers.

11. A filter in accordance with claim 10, wherein said frame has annular end portions and said fabric extends over and into said end portions.

12. A method for removing contaminants from a dry cleaning fluid comprising:
   (a) providing a filter including a long-fiber synthetic fabric and a rigid frame for supporting said fabric, said fabric having a cloth core and an outer fibrous region; and
   (b) passing a contaminated dry cleaning fluid through said fabric, said fluid passing first through said outer fibrous region and passing second through said cloth core, wherein said fabric collects the contaminants from said dry cleaning fluid to form a retentate on said outer fibrous region.

13. A method in accordance with claim 12, wherein said fabric is a synthetic fur material.

14. A method in accordance with claim 13, wherein said fabric is a mixture of polyester fibers and acrylic fibers.

15. A method in accordance with claim 14, wherein said fabric is a mixture of 90% polyester fibers and 10% acrylic fibers.

16. A method in accordance with claim 15, wherein said frame has annular end portions and fabric support members extending between said end portions.

17. A method in accordance with claim 16, wherein said fabric extends over and into said annular end portions.

* * * * *

UNITED STATES PATENT AND TRADEMARK OFFICE
CERTIFICATE OF CORRECTION

PATENT NO. : 5,139,686
DATED : August 18, 1992
INVENTOR(S) : George Cares

It is certified that error appears in the above-identified patent and that said Letters Patent is hereby corrected as shown below:

On the title page, item [75]:

"Geroge Cares" should be --George Cares--;

column 3, line 30:
"fabric 3" should be --fabric 32--.

Signed and Sealed this

Second Day of November, 1993

Attest:

BRUCE LEHMAN

Attesting Officer

Commissioner of Patents and Trademarks